Aug. 8, 1950 L. L. JONES ET AL 2,517,574
APPARATUS FOR ELECTRIC WELDING SIDE
SEAM PORTIONS OF CAN BODIES
Filed Oct. 29, 1946 4 Sheets-Sheet 4

INVENTORS
Lyman L. Jones
George K. Barger
BY Ivan L. Thornburgh
Charles H. Erne
ATTORNEYS Patented Aug. 8, 1950

2,517,574

UNITED STATES PATENT OFFICE 2,517,574

APPARATUS FOR ELECTRIC WELDING SIDE SEAM PORTIONS OF CAN BODIES

Lyman L. Jones and George K. Barger, Seattle, Wash., assignors to American Can Company, New York, N. Y., a corporation of New Jersey Application October 29, 1946, Serial No. 706,484

4 Claims. (Cl. 219—6)

The present invention relates to a machine for welding the side seam edges of tubular sheet metal container or can bodies and has particular reference to automatically operable clamping devices for engaging the side seam edges of moving can bodies and for holding the body edges in position for the welding operation.

An object of the invention is the provision of a machine for welding the side seam edges of tubular can bodies wherein the seam edges of a can body while moving along a predetermined path of travel are clamped together and held in position for welding so that a plurality of can bodies moving in a procession can be readily welded in rapid succession.

Another object is the provision of such a welding machine wherein the clamping of the side seam edges of the body is effected by rotatable discs arranged adjacent and on opposite sides of the path of travel of the body.

Another object is the provision of such a clamping device which permits of the separate support of the body so that supporting horns along which the body may be propelled may be used in conjunction with the clamping device.

Numerous other objects and advantages of the invention will be apparent as it is better understood from the following description, which, taken in connection with the accompanying drawings, discloses a preferred embodiment thereof.

Referring to the drawings.

Figure 4:
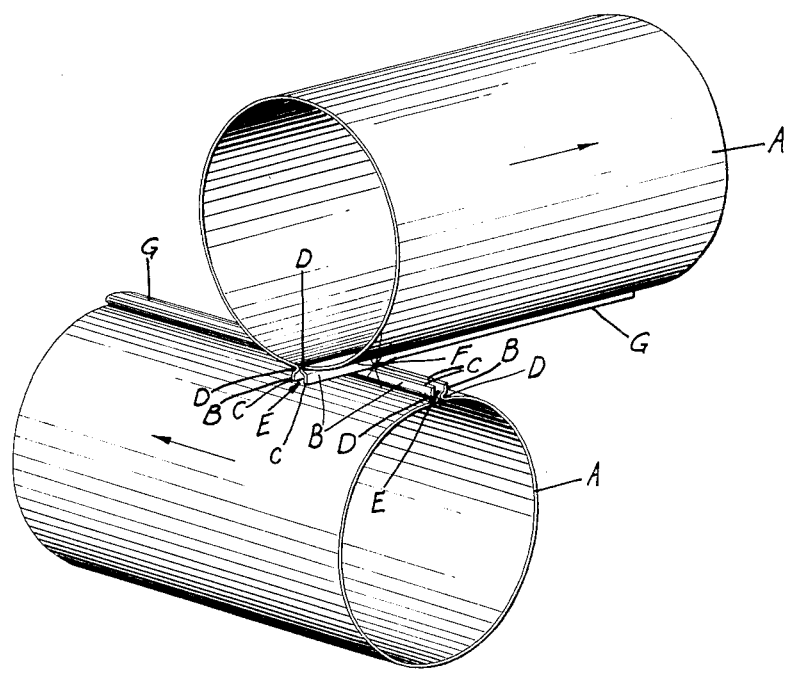
Fig. 4 is a schematic perspective view illustrating the position of two can bodies during the welding operation.

As a preferred embodiment of the invention the drawings illustrate a machine for welding the side seam edges of two sheet metal can bodies A (Fig. 4) simultaneously and while they move relative to each other. The can bodies to be welded preferably are made of tin plate or the like material. The marginal side seam portions of each body to be welded include longitudinal offset flanges B which extend outwardly at an angle to the outer surface of the can body, as best shown in Fig. 4. These flanges terminate in terminal edges C.

To effect the welding operation, the marginal side seam edges of a body are brought together, as will hereinafter be described, and this brings the two offset flanges B into juxtaposed, spaced and parallel relation. In this position the flanges B, together with step sections D which connect the flanges to the body side wall, form a U-shaped trough E which extends the entire length of the seam to be welded.

In the machine two such can bodies A have the side seam flanges B of one disposed adjacent the flanges B of the other. Both bodies are moved horizontally and endwise toward each other in synchronism and at an angle to each other so that their vertically projected paths of travel intersect. At the place of intersection, which will constitute the welding station, an electric welding current passes between the two moving can bodies.

This establishes an electric arc F between the intersecting flanges B. The ends of the arc terminate in the flanges of the bodies with the result that the terminal edges C of both bodies are heated to a welding temperature. This welding heat melts the edges C. The molten metal is drawn down by capillary attraction into the trough E and in this manner the flanges B of each can body are welded together. In this manner independent side seams G are formed in each body.

In sime cases this welding of the side seams is best effected when the two can bodies are spaced apart to provide a slight clearance space between the terminal edges C of the two moving bodies. In other cases better results are obtained when the terminal edges C of one body engage and ride along the corresponding edges of the other body. The invention is equally well adapted to both conditions.

Figure 2:
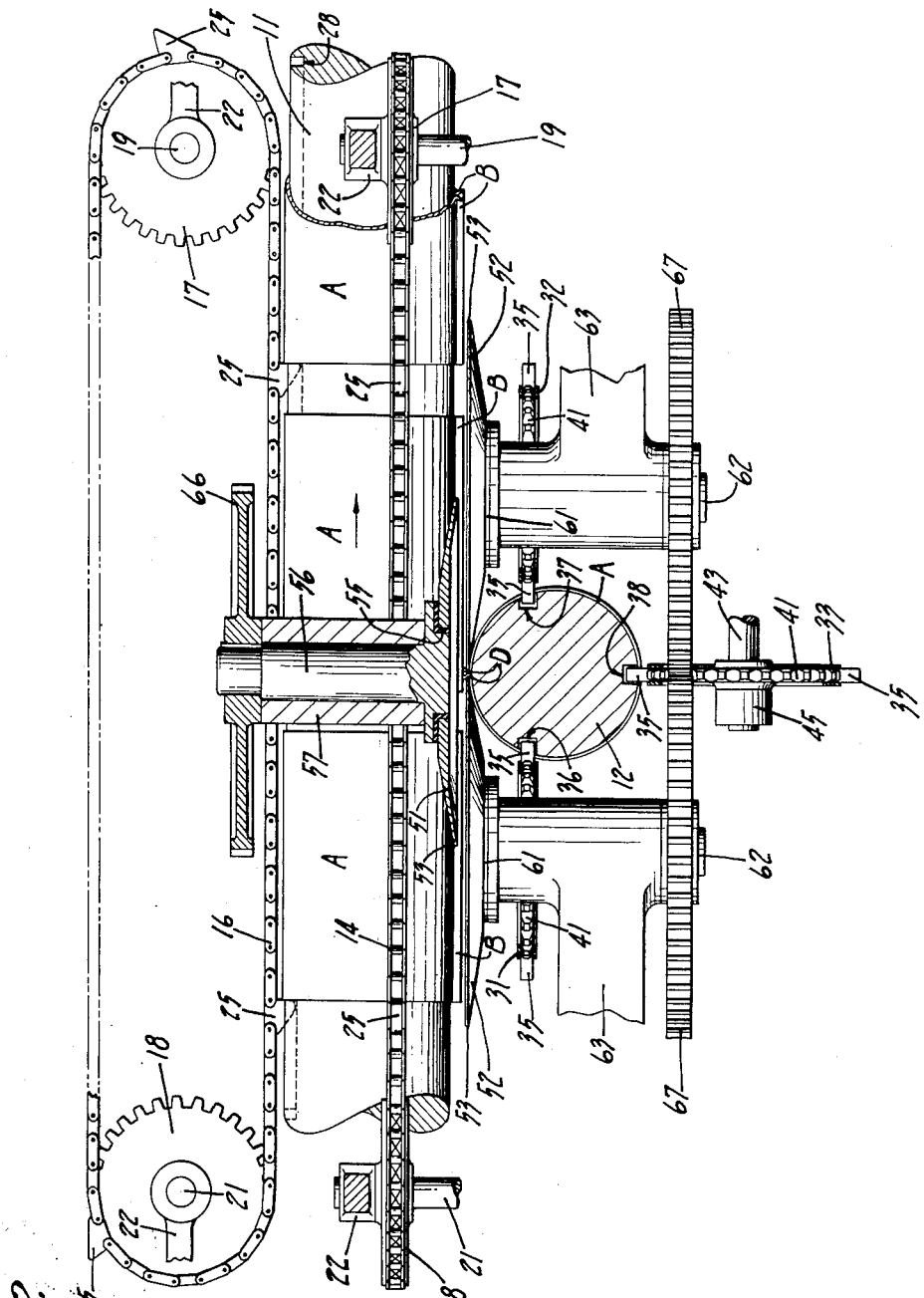
Figs. 2 and 3 are sectional views of the machine shown in Fig. 1, the views being taken substantially along the lines 2—2, 3—3 in that figure, with parts broken away.
Figure 3:
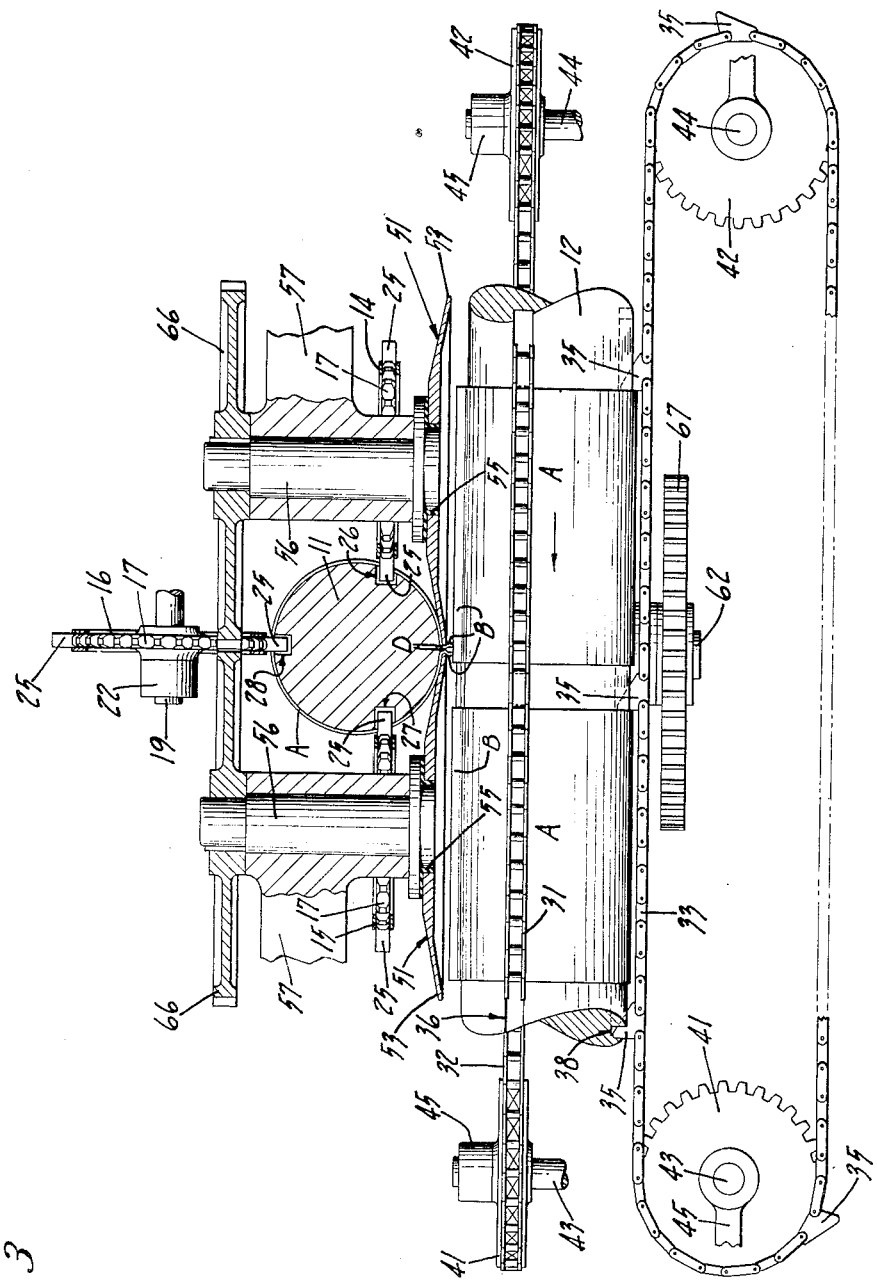

The moving can bodies A are supported on a pair of horizontal horns or mandrels 11 and 12 (Figs. 1, 2 and 3) which are disposed preferably at right angles to each other, one above the other and in spaced relation. The place where their vertical axial planes intersect is the welding station. These horns may be supported in a suitable frame or may be extended from a can body forming or other machine in which they are supported. The can bodies surround the horns, the bodies on the upper horn 11 having their side seam flanges C located under the horn, while the bodies on the lower horn 12 have their side seam flanges C disposed adjacent the top of the horn.

Figure 1:
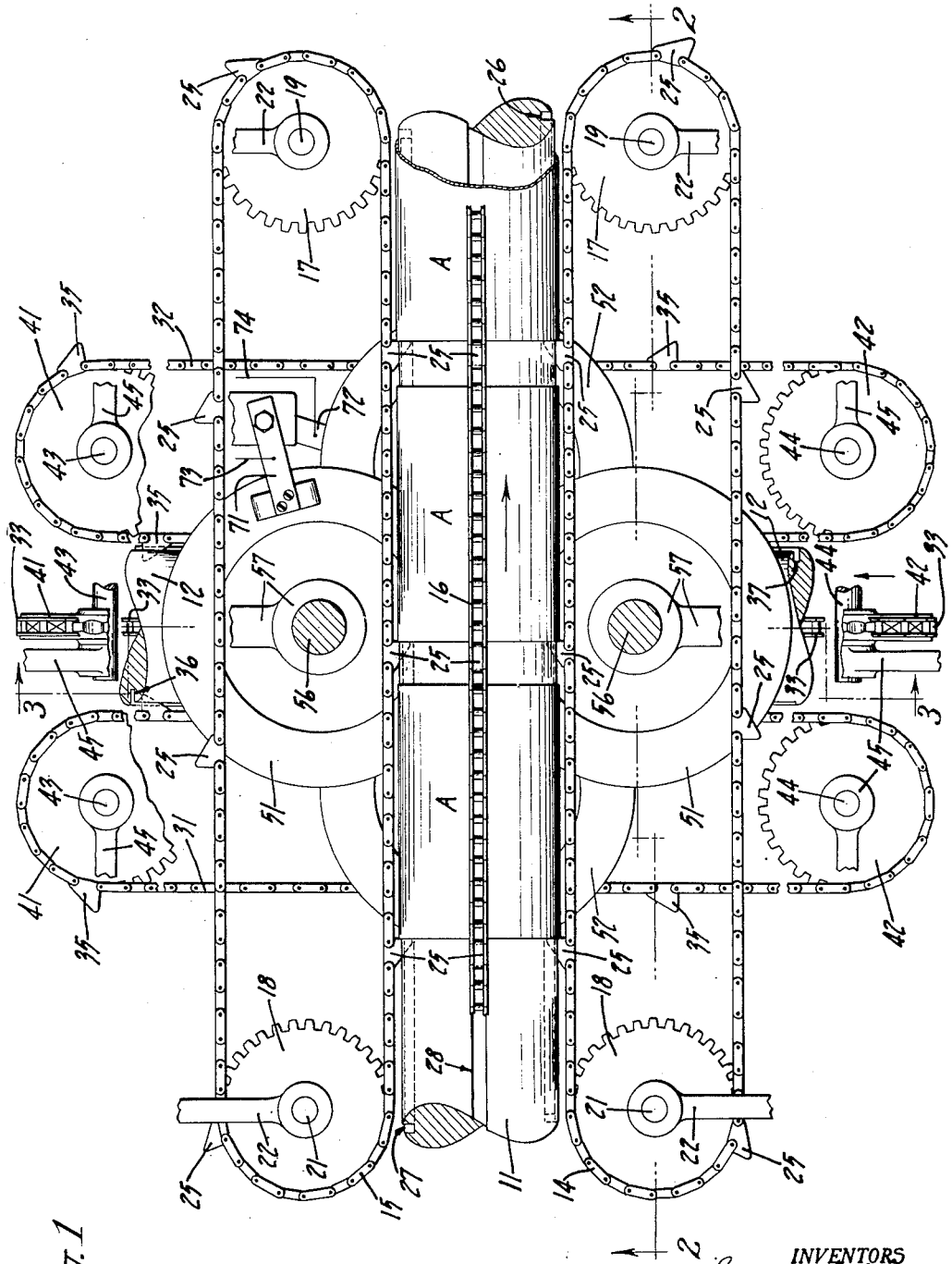
Figure 1 is a top plan view of a can body side seam welding machine embodying the instant invention, with parts broken away.

For welding, the can bodies are advanced along their respective horns 11, 12 in timed order and in a continuously moving procession in the directions indicated by the arrows shown in Fig. 1. For this purpose the upper horn 11 is equipped with three endless feed chain conveyors 14, 15, 16 which are disposed adjacent to and which extend along the horn. One of these conveyors is disposed adjacent the top of the horn while the other two are located on opposite sides of the horn in its bottom region.

The chains operate over driving sprockets 17 and idler sprockets 18 disposed in spaced relation along the horn on opposite sides of the welding station. The driving sprockets 17 are mounted on driving shafts 19 while the idler sprockets are mounted on idler shafts 21. These shafts are journaled in bearing brackets 22 which may be secured to or extend out from a suitable main frame. The driving shafts 19 are continuously rotated in synchronism in any suitable manner.

Along their lengths, the feed conveyors 14, 15, 16 are fitted with spaced feed dogs 25 which operate in clearance grooves 26, 27, 28 formed in the horn 11 adjacent their respective conveyors. These grooves extend longitudinally of the horn. The dogs on all chains are located in transverse alignment and engage behind a can body on the horn and propel it therealong through the welding station.

In a similar manner, can bodies on the lower horn 12 are propelled therealong through the welding station by a set of three endless chain conveyors 31, 32, 33 disposed adjacent this horn. Conveyor 33 is located under the horn while the other two conveyors are disposed alongside the horn in its top region there being one conveyor on each side. These conveyors carry spaced feed dogs 35 which engage behind the can bodies and thus advance them in the same timed order as the bodies moving along the upper horn 11. The feed dogs 35 operate in clearance grooves 36, 37, 38 (Fig. 2) formed in the horn adjacent their respective conveyors.

The lower conveyors 31, 32, 33 operate over driving sprockets 41 and idler sprockets 42 disposed on opposite sides of the welding station. The driving sprockets are mounted on driving shafts 43 while the idler sprockets are carried on idler shafts 44. These shafts are journaled in bearing brackets 45 which may be secured to or extend out from a suitable frame. The driving shafts are continuously rotated in synchronism and in time with the driving shafts 19 of the upper conveyors, in any suitable manner.

Thus the upper and the lower conveyors are actuated at the same lineal speed of travel along their respective horns. The feed dogs on the two sets of conveyors as a result travel in the same timed order. Hence two can bodies, located one on each horn, advance in unison and in synchronism along their respective horns and pass through the welding station. At such a time corresponding sections of the side seam flanges B of the moving can bodies simultaneously pass through the common intersection of the vertical axial planes of the two horns.

As the side seam flanges B of these two advancing can bodies enter the region of intersection, the flanges of the respective bodies are brought together independently of the adjacent body and are clamped or held in the juxtaposed relation hereinbefore mentioned for the welding operation. This clamping action on the body flanges is brought about preferably by pairs of horizontally disposed upper and lower clamping rollers or discs 51, 52 located at the welding station. The rollers of each pair are arranged on opposite sides of the associated horn and adjacent the paths of travel of the side seam flanges B of the bodies.

The clamping rollers 51, 52 are shallow dish shaped discs having thin tapered peripheral wall sections 53 adapted to fit in close to the horn. The outer circumference of these rollers engage the moving can bodies just under the step section D of the side seam flanges.

The two upper clamping rollers 51 are mounted on shouldered electric insulating sleeves 55 (Fig. 3) carried on the lower ends of a pair of vertically disposed collar shafts 56 located in bearing brackets 57 which may be secured to or extend out from a suitable machine frame.

The two lower clamping rollers 52 are similar to the two upper rollers 51 and are mounted on shouldered electric insulating sleeves 61 (Fig. 2) carried on the upper ends of a pair of vertically disposed collar shafts 62 located in bearing brackets 63 which may be secured to or extend out from the machine frame.

These clamping rollers 51, 52 preferably are rotated in unison and in timed order although in some cases it may be desired to let them run idle, rotation of the idle rollers being effected by frictional contact with the advancing can bodies. When the rollers are driven positively the upper rollers 51 are rotated by a pair of meshing spur gears 66 mounted on the upper ends of the collar shafts 56. The lower rollers 52 are rotated by a pair of meshing spur gears 67 mounted on the lower ends of the collar shafts 62. These gears may be driven in synchronism in any suitable manner.

Hence as a can body traveling along the upper horn 11 approaches the welding station, the leading edge of the body adjacent the steps D of the side seam flanges B enters between the two upper clamping rollers 51 which press the side seam portions of the body together as described above. Simultaneously with this action the side seam portions of the can body traveling along the lower horn 12, are brought together in the same manner, by their entrance between the two lower clamping rollers 52. The timing of the travel of the can bodies along their respective horns is such as to bring the leading edges of the moving bodies into register at the welding station at the same time.

As soon as the two can bodies are engaged by the clamping rollers 51, 52 an electric welding current is passed from one body to the other by way of their side seam flanges B. This establishes the welding arc F. Passage of electric welding current for this purpose is effected by way of a pair of stationary contact brushes 71, 72 (Fig. 1) which are connected by lead wires 73, 74 to a suitable source of electric current. Contact brush 71 engages against and rides upon one of the upper clamping rollers 51 while the contact brush 72 engages against and rides upon one of the lower clamping rollers 52.

Thus the electric welding current, passing from the contact brush 71 onto the upper clamping roller 51, is transmitted to the upper can body A and to its clamped side seam flanges B. From the flanges B of this upper body, the current jumps (arcs) to the clamped side seam flanges B of the lower can body and so returns by way of the lower clamping roller 52 through its contact brush 72. It is this passage of current that establishes the welding arc F and thus heats the seam edges C to welding temperature, as hereinbefore mentioned.

As the bodies continue to move along their respective horns and pass between their respective clamping rollers, the side seams of the bodies are progressively welded along their entire lengths as all portions of the seams pass through the successive arcs F. In this manner the seams of the two can bodies are welded simultaneously but independently of each other. Thus there is produced at the same time, two can bodies having separate welded side seams.

When the two moving bodies pass out of the grips of their respective clamping rollers 51, 52, the electric welding circuit is broken. The welded bodies continue to travel along their respective horns to a suitable place of discharge.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In a machine for welding the side seam edges of tubular sheet metal can bodies, the combination of a pair of supports disposed adjacent each other in spaced relation for separately supporting can bodies, with their side seams facing each other when the bodies are in predetermined positions, means for advancing the can bodies along each of said supports simultaneously and in timed relation so that their paths of travel intersect in a projected point of intersection with one side seam passing closely adjacent the other, a pair of clamping discs disposed adjacent each of said supports on opposite sides of the path of travel of the can bodies advancing along each support for pressing and holding the side seam edges of each can body together in welding position at the said point of intersection as the bodies advance, and means for passing an electric welding current through said point of intersection and between the side seam edges of two can bodies advancing along said pair of supports and through said point of intersection for welding these edges together as the bodies advance.

2. In a machine for welding the side seam edges of tubular sheet metal can bodies, the combination of a pair of supports disposed adjacent and at an angle to each other in spaced relation for supporting can bodies with their side seams in opposing positions, means for advancing the can bodies along said supports simultaneously and in timed relation so that one side seam closely passes the other, a pair of clamping discs disposed adjacent each of said supports on opposite sides of the paths of travel of the can bodies advancing along each support for pressing and holding the side seam edges of the corresponding body together in welding position as the bodies advance with their seams adjacent, and means for creating an electric welding arc between the positioned side seam edges of two can bodies advancing along said pair of supports for passing the welding current directly from one side seam to the other thus welding these edges together as the bodies advance.

3. In a machine for welding side seam edges of tubular sheet metal can bodies, the combination of an upper horizontally disposed mandrel for supporting a can body with its side seam edges beneath the mandrel, a lower horizontally disposed mandrel located at right angles to said upper mandrel for supporting a can body with its side seam edges above the mandrel, means for advancing can bodies along each mandrel so that the side seam edges of a can body on the upper mandrel pass by the side seam edges of a can body on the lower mandrel, clamping discs disposed on opposite sides of said upper mandrel for pressing and holding the depending side seam edges of the can body on the upper mandrel, clamping discs disposed on opposite sides of the lower mandrel for pressing and holding the upstanding side seam edges of a can body on the lower mandrel, and means for passing an electric welding current directly between the side seam edges of one advancing can body and the side seam edges of the other advancing can body for welding these side seam edges together to simultaneously produce two welded side seams.

4. In a machine for welding the side seam edges of tubular sheet metal can bodies, the combination of a support for a can body, means for advancing the can body along said support with its side seam edges extending outwardly, a pair of clamping discs disposed adjacent said support on opposite sides of the path of travel of the advancing can body for pressing and holding the side seam edges of the body together in welding position as the body advances, means for bringing the seam of a second can body into juxtaposed position relative to the clamped seam edges between said clamping discs, and electrical means for passing an electrical welding current through one of said clamping discs and into said clamped seam edges of the first can body and through a juxtaposed seam of said second can body to weld the former clamped seam edges together while they are so held by said clamping discs, the full length of the side seam being progressively welded as the can body advances along said support.

LYMAN L. JONES.
GEORGE K. BARGER.

REFERENCES CITED

The following references are of record in the file of this patent:

UNITED STATES PATENTS

| Number | Name | Date |
|---|---|---|
| 1,808,261 | Sessions | June 2, 1931 |

FOREIGN PATENTS

| Number | Country | Date |
|---|---|---|
| 380,397 | Great Britain | Sept. 15, 1932 |